United States Patent
Estevo, Jr. et al.

(10) Patent No.: US 11,427,352 B2
(45) Date of Patent: Aug. 30, 2022

(54) ROTORCRAFT SERVICE FIXTURES

(71) Applicant: THE BOEING COMPANY, Chicago, IL (US)

(72) Inventors: Curtis Raymond Estevo, Jr., Mesa, AZ (US); Jared Cook Tompkinson, Mesa, AZ (US); Talmadge Eugene Ryan, III, Gilbert, AZ (US); Carlos R. Aguirre, Apache Junction, AZ (US); James Curtis Eason, San Tan Valley, AZ (US); Erich Lloyd Zimmerman, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 742 days.

(21) Appl. No.: 16/271,633

(22) Filed: Feb. 8, 2019

(65) Prior Publication Data
US 2020/0255120 A1    Aug. 13, 2020

(51) Int. Cl.
*B64F 5/40* (2017.01)
*B64F 5/60* (2017.01)
*B64F 5/10* (2017.01)

(52) U.S. Cl.
CPC .................. *B64F 5/40* (2017.01); *B64F 5/60* (2017.01); *B64F 5/10* (2017.01); *Y10T 29/37* (2015.01); *Y10T 29/49318* (2015.01); *Y10T 29/53983* (2015.01)

(58) Field of Classification Search
CPC ...... B64F 5/40; B64F 5/60; B64F 5/10; Y10T 29/37; Y10T 29/49318; Y10T 29/53983
See application file for complete search history.

(56) References Cited

U.S. PATENT DOCUMENTS

| | | | | |
|---|---|---|---|---|
| 2,468,983 A | * | 5/1949 | Johnson | B25B 23/0085 81/488 |
| 3,173,234 A | * | 3/1965 | Vodinelich | A01D 34/828 248/229.15 |
| 3,986,242 A | * | 10/1976 | Kerr | B63H 23/34 29/261 |
| 4,208,859 A | * | 6/1980 | Brockway | A01D 34/828 248/302 |
| 4,297,921 A | * | 11/1981 | Wydra | B27B 5/32 29/283 |
| 4,315,339 A | * | 2/1982 | Lightner | B25B 27/26 7/138 |
| 4,715,783 A | * | 12/1987 | Wade | E05B 73/0076 416/146 R |

(Continued)

*Primary Examiner* — Jason L Vaughan
(74) *Attorney, Agent, or Firm* — Moore IP Law

(57) ABSTRACT

A rotorcraft service fixture includes a fixture body and one or more rotor assembly connectors rigidly attached to or integral with the fixture body. The one or more rotor assembly connectors are sized and shaped to provide an interference fit with a portion of a rotor assembly of a rotorcraft to removably attach the fixture body to the portion of the rotor assembly. The rotorcraft service fixture also includes one or more support connectors rigidly attached to or integral with the fixture body. The one or more support connectors are sized and shaped to provide an interference fit with a partially detached component of the rotor assembly to immobilize the partially detached component during inspection or maintenance of the rotor assembly.

17 Claims, 8 Drawing Sheets

(56) References Cited

U.S. PATENT DOCUMENTS

| | | | | |
|---|---|---|---|---|
| 4,850,800 A * | 7/1989 | Zygutis | ................. | B63H 20/36 |
| | | | | 416/62 |
| 4,882,960 A * | 11/1989 | Kugler | ................... | B25B 33/00 |
| | | | | 269/319 |
| 4,934,037 A * | 6/1990 | Schuerg | ................. | B25B 23/00 |
| | | | | 29/283 |
| D329,364 S * | 9/1992 | Schuerg | ........................... | D8/71 |
| D358,076 S * | 5/1995 | Woller | .......................... | D8/331 |
| 5,454,153 A * | 10/1995 | Noel | ...................... | B23Q 16/00 |
| | | | | 269/50 |
| 5,887,460 A * | 3/1999 | Williams | ............ | E05B 73/0076 |
| | | | | 70/58 |
| 6,185,817 B1 * | 2/2001 | Sims | .................... | B25B 27/023 |
| | | | | 29/259 |
| 6,332,256 B1 * | 12/2001 | Dawson | ............... | F02F 7/0046 |
| | | | | 29/271 |
| 6,347,445 B2 * | 2/2002 | Long, Jr. | .............. | A01D 34/001 |
| | | | | 269/319 |
| 6,935,004 B2 * | 8/2005 | Terrill | ................... | B25B 27/023 |
| | | | | 29/259 |
| 7,421,771 B2 * | 9/2008 | Heathman | ............... | B25B 13/02 |
| | | | | 294/92 |
| 8,307,527 B2 * | 11/2012 | Huang | ................... | B25B 27/14 |
| | | | | 29/281.5 |
| 8,793,856 B2 * | 8/2014 | Werner | .................... | B64F 5/60 |
| | | | | 33/645 |

* cited by examiner

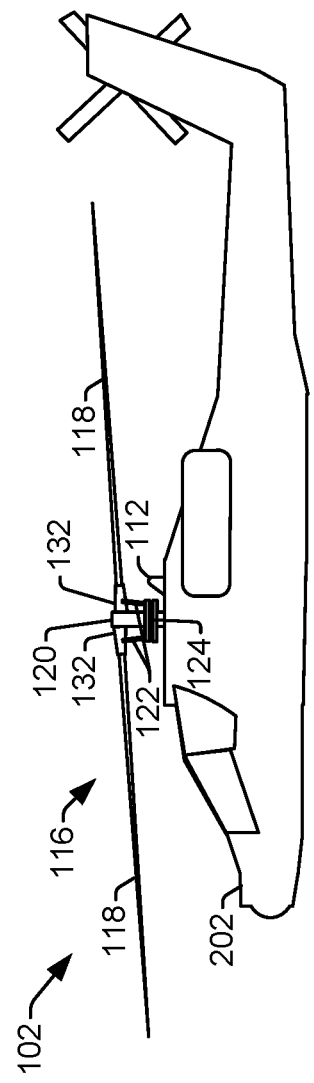
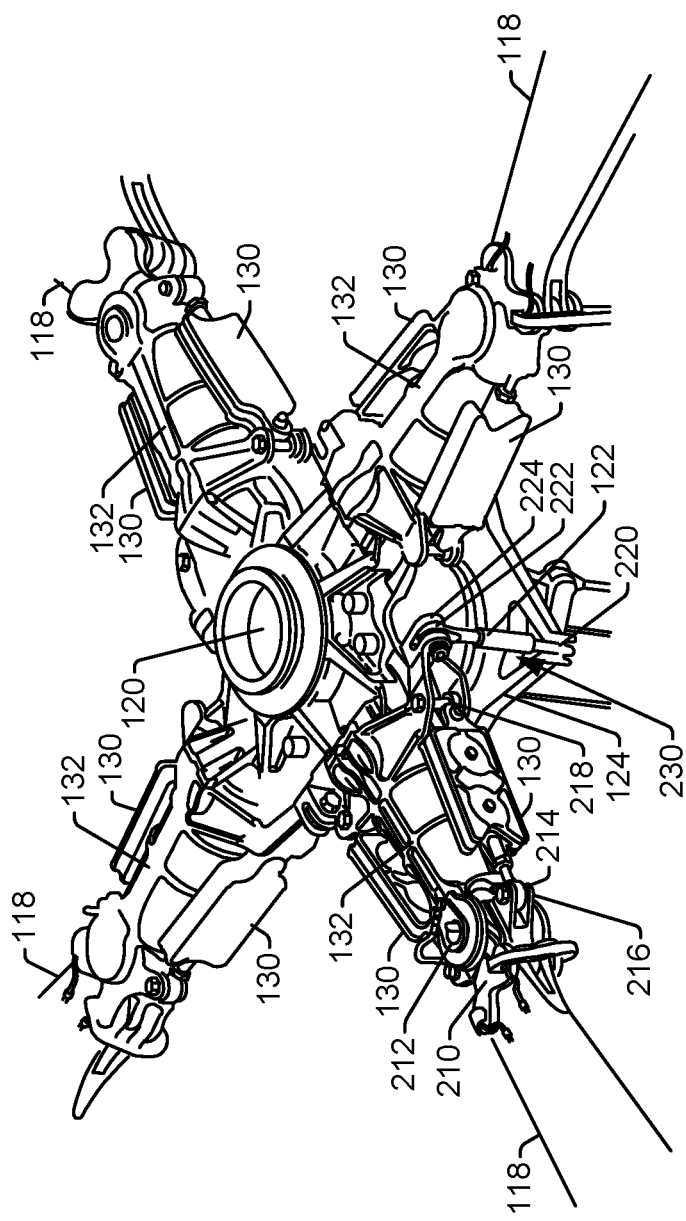
FIG. 2A
FIG. 2B

ROTORCRAFT SERVICE FIXTURES

This invention was made with Government support under W58RGZ-16-C-0023 awarded by Department of Defense. The government has certain rights in this invention.

FIELD OF THE DISCLOSURE

The present disclosure is generally related to rotorcraft service fixtures.

BACKGROUND

It is not uncommon for an aircraft to have several hours of maintenance and inspections for each hour of flight. Further, a rotorcraft or rotary-wing aircraft (e.g., an aircraft that generates at least a portion of its lift during at least a portion of a flight profile based on rotation of a moveable wing or rotor) typically requires more maintenance and inspections per flight hour than a comparable fixed wing aircraft. Reducing the time and expense of rotorcraft maintenance and inspection can improve operational readiness of the rotorcraft and reduce overall cost of ownership of the rotorcraft.

SUMMARY

In a particular implementation, a rotorcraft service fixture includes means for removably attaching to a rotor assembly of a rotorcraft. The rotorcraft service fixture also includes means for supporting a first component of the rotor assembly. The means for supporting is rigidly coupled to the means for removably attaching, and the means for supporting is configured to immobilize the first component relative to a second component of the rotor assembly after the first component is partially detached from the rotor assembly during inspection or maintenance of the rotor assembly.

In another particular implementation, a rotorcraft service fixture includes a fixture body and one or more rotor assembly connectors rigidly attached to or integral with the fixture body. The one or more rotor assembly connectors are sized and shaped to provide an interference fit with a portion of a rotor assembly of a rotorcraft to removably attach the fixture body to the portion of the rotor assembly. The rotorcraft service fixture also includes one or more support connectors rigidly attached to or integral with the fixture body. The one or more support connectors are sized and shaped to provide an interference fit with a partially detached component of the rotor assembly to immobilize the partially detached component during inspection or maintenance of the rotor assembly.

In a particular implementation, a method of servicing a rotorcraft includes attaching a first connector of a service fixture to a portion of a rotor assembly of a rotorcraft. The method also includes partially detaching a component of the rotor assembly and immobilizing the partially detached component using a second connector of the service fixture during inspection or maintenance of the rotor assembly.

BRIEF DESCRIPTION OF THE DRAWINGS

FIG. 2A is a diagram that illustrates a detailed example of the rotorcraft of FIG. 1.

FIG. 2B is a diagram that illustrates a detailed example of a portion of a rotor assembly of the rotorcraft of FIG. 2A.

DETAILED DESCRIPTION

Figure 1:
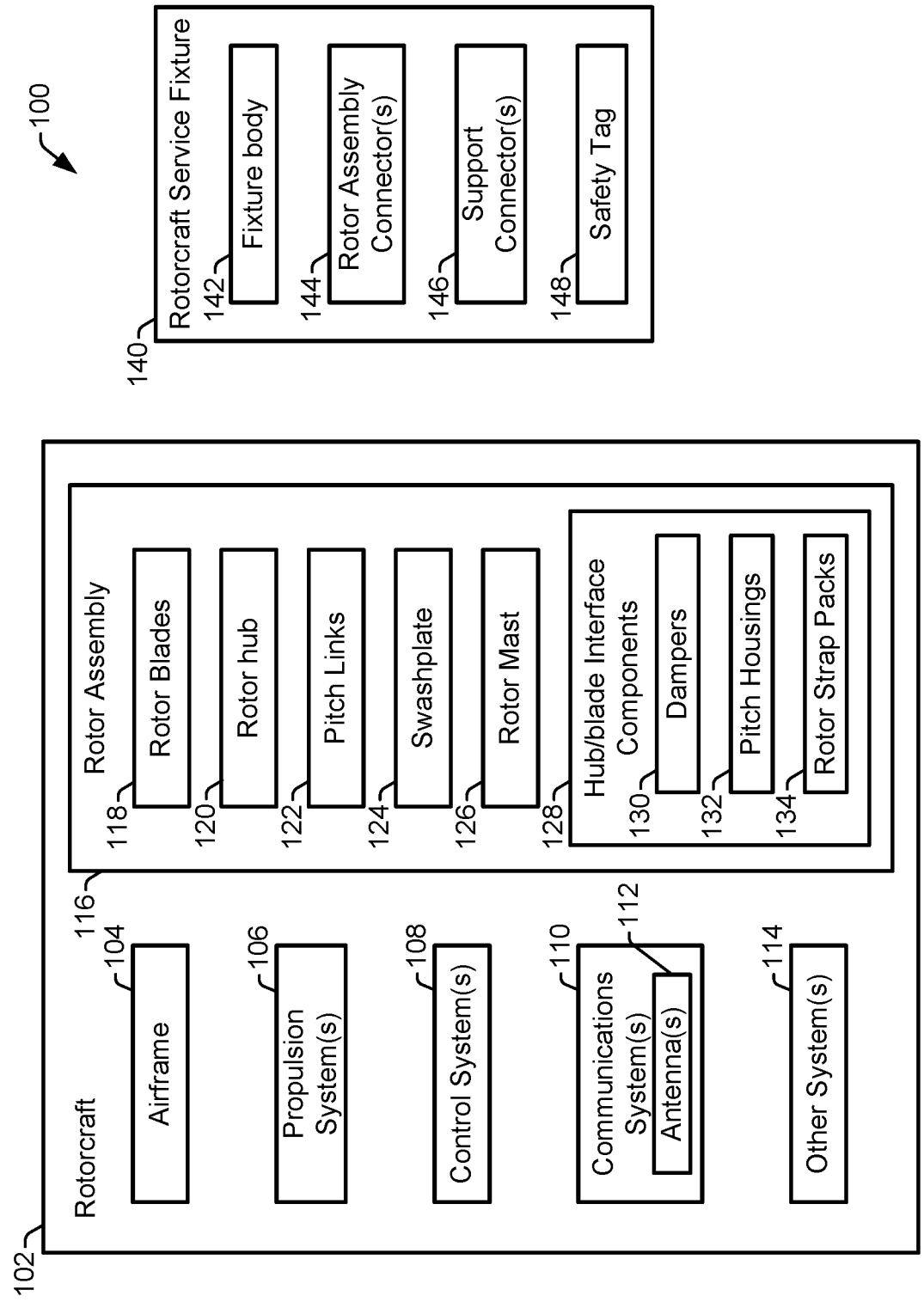
FIG. 1 is a block diagram that illustrates an example of a rotorcraft and a rotorcraft service fixture.

In a particular implementation, a rotorcraft service fixture is used to reduce time and expense associated with rotorcraft inspection and maintenance. The rotorcraft service fixture is sized and shaped to couple a partially disconnected component of a rotorcraft to another component of the rotorcraft to limit movement of the partially disconnected component, to prevent the partially disconnected component from inadvertently or unintentionally contacting other components of the rotorcraft, etc.

The rotorcraft service fixture is especially useful during inspection or maintenance of a rotor assembly of a rotorcraft. Typically, the rotor assembly of a rotorcraft includes multiple rotor blades and a corresponding set of support and control components, as detailed below. The rotor blades and the support and control components are interconnected with one another and coupled to a rotatable rotor hub. During maintenance or inspection, a rotor blade or another component of the rotor assembly may be disconnected from, or partially disconnected from, the rotor assembly to enable inspection or maintenance. Rotation of the rotor hub while a component of the rotor assembly is partially disconnected and not constrained can cause the partially disconnected component to be damaged or can cause the partially disconnected component to come into contact with and damage another component of the rotorcraft.

The rotorcraft service fixture is designed to be simple to use. For example, in a particular implementation, the rotorcraft service fixture is configured (e.g., sized and shaped) to couple to a portion of the rotor assembly and to a partially disconnected component using an interference fit. Thus, the rotorcraft service fixture can be installed one-handed and no tools are needed to install or remove the rotorcraft service fixture. The rotorcraft service fixture is also designed to be inexpensive to manufacture. To illustrate, in some implementations, the rotorcraft service fixture is a one-piece apparatus with no moving parts. The rotorcraft service fixture is shaped to enable its manufacture via three-dimensional (3D) printing with little or no post-print processing. The rotorcraft service fixture is also designed to be highlyvisible and reusable to reduce a risk of foreign object damage to the rotorcraft. For example, the rotorcraft service fixture can be manufactured by 3D printing using a brightly colored (high-visibility) polymer, such as a flexible thermoplastic polyurethane material. In other implementations, other polymers can be used. Generally, elastomeric polymers provide the expected durability while also facilitating tight interference fits with the various components. Further, the polymer selected should not scratch paint and other coatings of the components. In some implementations, the rotorcraft service fixture can be assembled from multiple smaller 3D printed parts to enable manufacturing the rotorcraft service fixture on smaller 3D printing platforms.

FIG. 1 is a block diagram that illustrates a system 100 that includes an example of a rotorcraft 102 and a rotorcraft service fixture 140. The rotorcraft 102 includes an airframe 104 coupled to or including a plurality of systems. In the example illustrated in FIG. 1, the plurality of systems include one or more propulsion systems 106 (e.g., one or more engines or motors), one or more control systems 108 (e.g., flight control systems), one or more communication systems 110 including one or more antennas 112, and other systems 114 (e.g., radar systems, weapons systems, etc.).

The rotorcraft 102 also includes a rotor assembly 116 which, during take-off and/or during flight, provides at least a portion of lift generated by the rotorcraft 102. For example, the rotorcraft 102 can correspond to a helicopter, a compound helicopter, or an autogyro, in which case the rotor assembly 116 provides substantially all of the lift generated by the rotorcraft 102. In another example, the rotorcraft 102 can correspond to a hybrid aircraft (e.g., a helicopter with winglets, or a tilt-wing or tilt-rotor aircraft) that includes both the rotor assembly 116 and wings or other lift generating surfaces, in which case the rotor assembly 116 can provide only a portion of the lift generated by the rotorcraft 102 during at least some stages of flight. Although FIG. 1 illustrates the rotorcraft 102 as including a single rotor assembly 116, in some implementations, the rotorcraft 102 includes more that one rotor assembly 116.

In the example illustrated in FIG. 1, the rotor assembly 116 includes multiple rotor blades 118 coupled to a rotor hub 120. The rotor assembly 116 also includes a swashplate 124 that is coupled to the rotor blades 118 via multiple pitch links 122. A rotor mast 126 spaces the rotor blades 118 and rotor hub 120 away from the airframe 104 to provide clearance for rotation of the rotor hub 120 and rotor blades 118. The rotor blades 118 are coupled to the rotor hub 120 via hub/blade interface components 128, such as dampers 130, pitch housings 132, rotor strap packs 134, etc.

The rotorcraft service fixture 140 is configured to couple to a portion of the rotor assembly 116 during service or maintenance of the rotorcraft 102, as described further below. The rotorcraft service fixture 140 includes a fixture body 142. One or more rotor assembly connectors 144 and one or more support connectors 146 are coupled to or integrated with (e.g., as a single unified component) the fixture body 142. In some implementations, the rotorcraft service fixture 140 also includes a safety tag 148 to improve visibility of the rotorcraft service fixture 140. The rotor assembly connector(s) 144 is configured to coupled to a portion of the rotor assembly 116, and the support connector(s) 146 is configured to couple to a portion of a partially detached component to immobilize the partially detached component.

FIG. 2A is a diagram that illustrates a detailed example of the rotorcraft 102, and FIG. 2B is a diagram that illustrates a detailed example of a portion of the rotor assembly 116 of the rotorcraft 102. FIGS. 2A and 2B provide context to illustrate the complex challenge of servicing or inspecting the rotor assembly 116 of the rotorcraft 102. In FIGS. 2A and 2B, each of the rotor blades 118 is coupled to the rotor hub 120 via a respective one of the rotor strap packs 134 (shown in FIG. 6B). Each rotor strap pack 134 passes through a respective one of the pitch housings 132. Each of the pitch housings 132 is coupled to the rotor hub 120 and to a respective rotor blade 118 via a hinge pin 212 and a lead/lag link 210 (shown in FIG. 2B). Each of the lead/lag links 210 is coupled to a respective pair of the dampers 130. To illustrate, as shown in FIG. 2B, a first end 214 of a damper 130 is coupled to a bracket 216 of the lead/lag link 210, and a second end 218 of the damper 130 is coupled to the pitch housing 132. In the particular implementation illustrated in FIG. 2B, a first end 220 of the pitch link 122 is coupled to the swashplate 124 (proximate an opening 230 in the swashplate 124), and a second end 222 of the pitch link 122 is coupled to a bracket 224 of the pitch housing 132.

During maintenance or inspection of the rotorcraft 102, the rotor assembly 116 can be partially disassembled to enable removal of or inspection of particular components. Partial disassembly of the rotor assembly 116 involves disconnecting or partially disconnecting one or more components of the rotor assembly 116. In this context, partially disconnecting refers to disconnecting one or more connectors that are coupled to a component and not disconnecting one or more other connectors that are coupled to the component. For example, during some maintenance or inspection operations, one or more of the pitch links 122 can be disconnected from the swashplate 124 but remain coupled to the pitch housing 132 or can be disconnected from the pitch housing 132 but remain coupled to the swashplate 124. As another example, during some maintenance or inspection operations, one or more of the rotor blades 118 can be removed, in which case the rotor strap pack 134 associated with the rotor blade 118 is disconnected from the rotor blade 118 but can remain coupled to the rotor hub 120. Additionally, when the rotor blade 118 is removed, the pitch housing 132 associated with the rotor blade 118 can be disconnected from the rotor blade 118 but can remain coupled to rotor hub 120, and the dampers 130 associated with the rotor blade 118 can be disconnected from the rotor blade 118 but can remain coupled to pitch housing 132.

When a component of the rotor assembly 116 is partially disconnected, the component can come into contact with other components of the rotor assembly 116 or with other components of the rotorcraft 102, which risks damaging the partially disconnected component, the other component, or both. The risk of damage due to partially disconnected components of the rotor assembly 116 is exacerbated because many of the components of the rotor assembly 116 are movable parts that rotate about an axis of the rotor hub 120 or rotate about an axis of a pitch housing 132. For example, when a pitch link 122 is partially disconnected and the rotor hub 120 rotates, the pitch link 122 rotates, relative to other components of the rotorcraft 102, around the axis of the rotor hub 120. As a result of such rotation, the pitch link 122 can damage another component or be damaged itself. To illustrate, in the example illustrated in FIG. 2A, an antenna 112 is coupled to an upper surface of a body 202 of the rotorcraft 102. A partially disconnected pitch link 122 can contact the antenna 112 due to rotation about the axis of the rotor hub 120, which can damage the antenna 112, the pitch link 122, or both. Although an antenna 112 is illustrated in this example, in other examples, the upper surface of the body 202 of the rotorcraft 102 can include other features, such as other antennas, structural or aerodynamic features, and/or features associated with various other systems of the rotorcraft 102, any of which can damage or be damaged by a partially disconnected pitch link 122.

As another example, when a rotor blade 118 is removed, a pitch housing 132, dampers 130, and a rotor strap pack 134 can be left partially disconnected. Each of these components rotates about an axis of the rotor hub 120 if the rotor hub 120 rotates. Accordingly, in some circumstances, one of these components may contact another component of the rotorcraft 102 (or another object) thereby potentially causing damage. Further, the pitch housing 132 is also rotatable about an axis that extends in a direction corresponding to the length of the rotor blade 118, and in the example illustrated in FIG. 2B, two dampers 130 are coupled to each pitch housing 132 and rotate with the pitch housing 132. The rotor strap pack 134 passes through the pitch housing 132 and is flexible. Thus, when partially disconnected, the pitch housing 132, the dampers 130, and the rotor strap pack 134 can be inadvertently damaged or can damage another component of the rotorcraft 102. The rotorcraft service fixture 140 of FIG. 1 can be used to immobilize a partially disconnected component thereby limiting the risk of damage.

Figure 3:
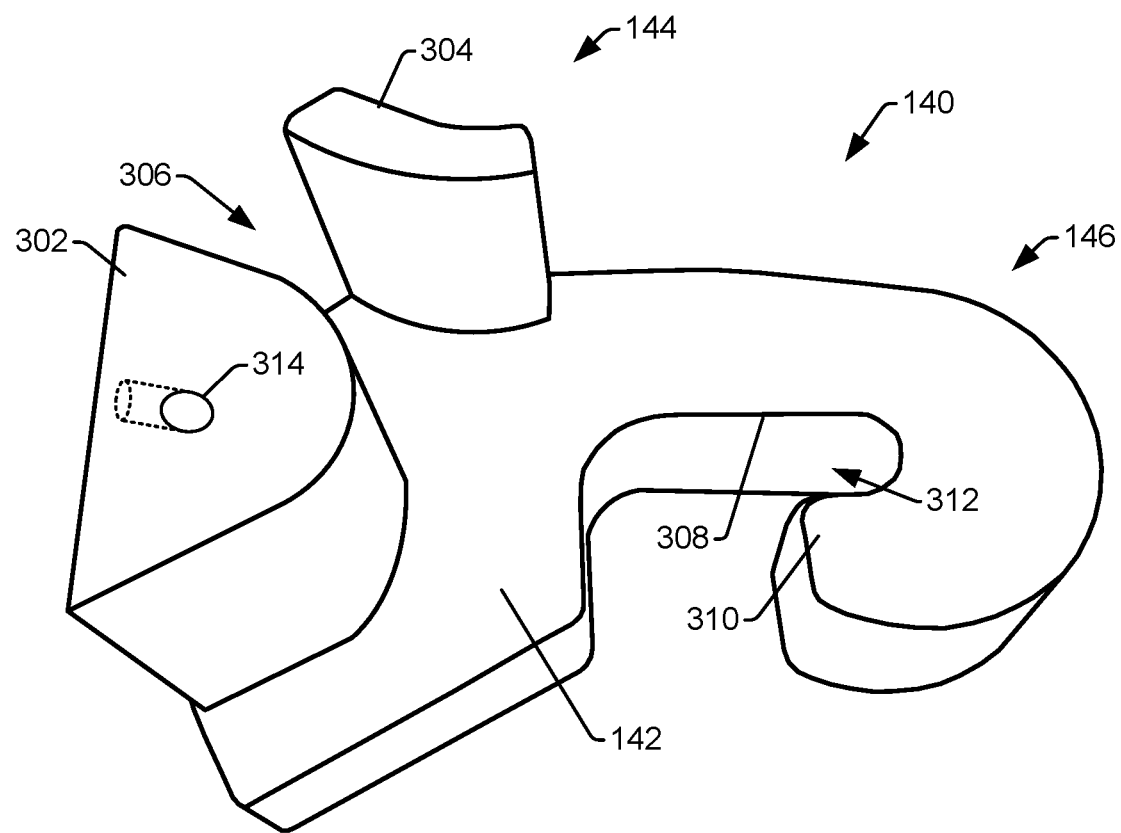
FIG. 3 is a diagram that illustrates an example of the rotorcraft service fixture of FIG. 1 according to a particular implementation.

FIG. 3 is a diagram that illustrates an example of the rotorcraft service fixture 140 of FIG. 1 according to a particular implementation. The rotorcraft service fixture 140 illustrated in FIG. 3 is configured to couple to the swashplate 124 and to retain (e.g., immobilize) a partially detached pitch link 122. In the example illustrated in FIG. 3, the rotorcraft service fixture 140 includes a first protrusion 302 and a second protrusion 304 that together define a channel 306. The first protrusion 302, the second protrusion 304, and the channel 306 correspond to the rotor assembly connector 144 according to the particular implementation illustrated in FIG. 3. For example, the channel 306 provides an interference fit of the rotorcraft service fixture 140 to a portion of the swashplate 124 when the second protrusion 304 is position to contact an outer surface of the swashplate 124 and the first protrusion 302 is positioned in the opening 230 of the swashplate 124.

In the example illustrated in FIG. 3, the rotorcraft service fixture 140 also includes a first member 308 and a second member 310 that are arranged in a hook shape to define a channel 312. The first member 308, the second member 310, and the channel 312 correspond to the support connector 146 according to the particular implementation illustrated in FIG. 3. For example, the channel 312 provides an interference fit of the rotorcraft service fixture 140 to a portion of a pitch link 122 when the pitch link 122 is partially disconnected from the rotor assembly 116. In a particular implementation, the rotorcraft service fixture 140 also includes an opening 314 to receive the safety tag 148 or to receive a lanyard that is coupled to the safety tag 148.

The rotorcraft service fixture 140 is configured (e.g., sized and shaped) to enable coupling the rotor assembly connector 144 to the swashplate 124 while the pitch link 122 is connected to the swashplate 124, while the pitch link 122 is connected to the pitch housing 132, or while the pitch link 122 is connected to both the swashplate 124 and the pitch housing 132. For example, a particular maintenance procedure can entail disconnecting the pitch link 122 from the pitch housing 132. To perform this maintenance procedure, the rotorcraft service fixture 140 can be coupled to the swashplate 124 by sliding the channel 306 over a wall that defines a portion of the opening 230 such that the first protrusion 302 is disposed within the opening 230 and in contact with an inner surface of the wall and the second protrusion 304 is disposed external to the opening 230 and in contact with an outer surface of the wall. The width of the channel 306 is the same size as (within manufacturing tolerances) the thickness of the wall or, if the rotorcraft service fixture 140 includes an elastomeric polymer, slightly smaller than the thickness of the wall. Thus, the channel 306 provides an interference fit to the wall to retain the rotorcraft service fixture 140 in place relative to the swashplate 124. After positioning the rotorcraft service fixture 140 on the swashplate 124, the pitch link 122 can be disconnected from the pitch housing 132 and rotated such that a portion of the pitch link 122 is disposed within the channel 312. In a particular implementation, the channel 312 provides an interference fit to the portion of the pitch link 122 to inhibit motion of the pitch link 122 relative to the rotorcraft service fixture 140.

Figure 4B:
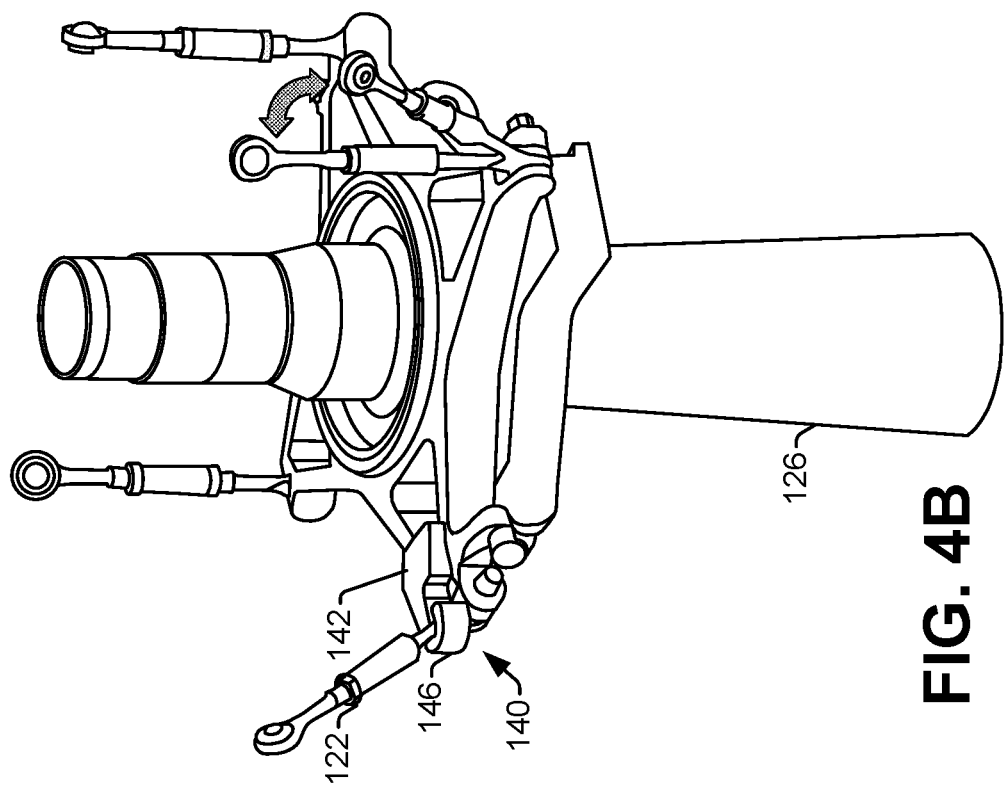
FIG. 4B is a diagram that illustrates the rotorcraft service fixture of FIG. 3 supporting one of pitch links of FIG. 4A.
Figure 4A:
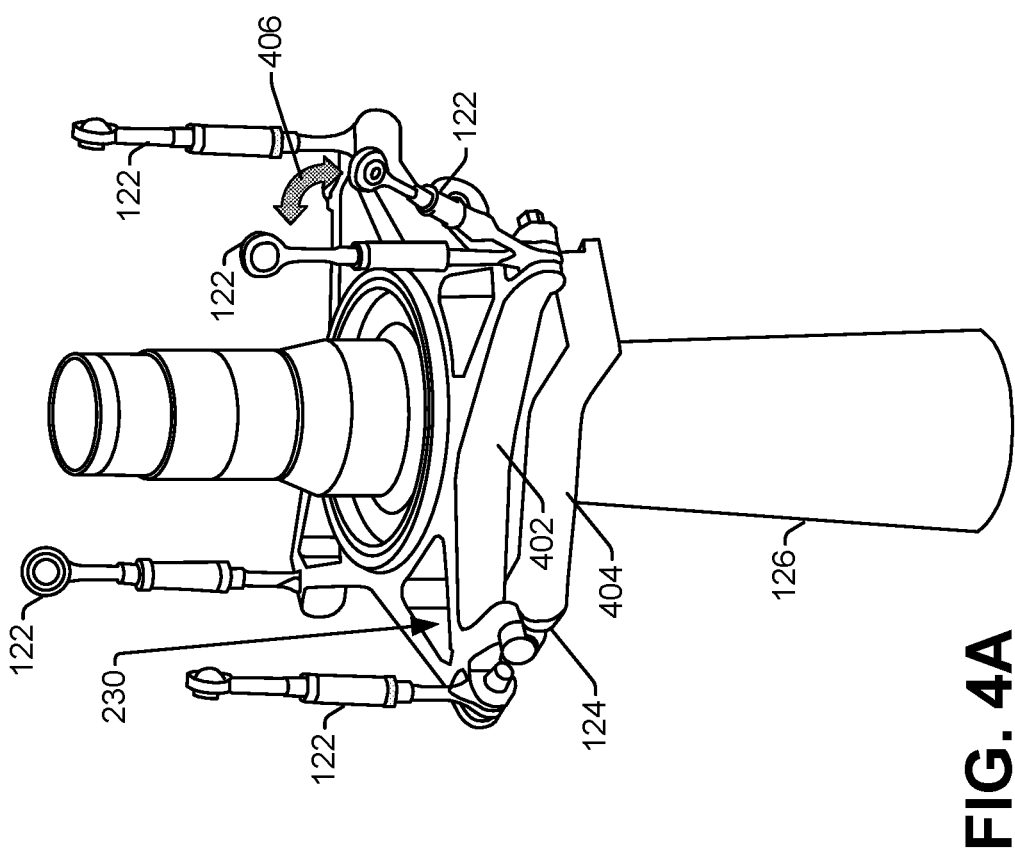
FIG. 4A is a diagram that illustrates a portion of the rotor mast of FIG. 1 or FIG. 2 including a swashplate and pitch links.

FIG. 4A is a diagram that illustrates a portion of the rotor mast 126 of FIG. 1 or FIG. 2 including a swashplate 124 and a plurality of pitch links 122, and FIG. 4B is a diagram that illustrates the rotorcraft service fixture 140 of FIG. 3 supporting a particular one of the pitch links 122 of FIG. 4A. In the particular implementation illustrated in FIGS. 4A and 4B, the swashplate 124 includes an upper plate 402 and a lower plate 404. In this implementation, the opening 230 is defined in at least the upper plate 402. In FIG. 4A, each of the pitch links 122 is shown in an upright position corresponding approximately to a fully installed position of each pitch link 122 (e.g., as though each pitch link were coupled to a respective pitch housing 132 that is not shown in FIGS. 4A and 4B). FIG. 4A also illustrates a rotational direction 406 of one of the pitch links 122 in the circumstance were the pitch link 122 is detached from its respective pitch housing 132. In this circumstance, the pitch link 122 is free to rotate to any angle along the rotational direction 406 that is not obstructed by the rotor mast 126, the swashplate 124, or another structure of the rotorcraft 102.

In FIG. 4B, the rotorcraft service fixture 140 of FIG. 3 has been installed on the swashplate 124 and one of the pitch links 122 is partially disconnected. In particular, the partially disconnected pitch link 122 has been disconnected from its respective pitch housing 132 but remains connected to the swashplate 124. The partially disconnected pitch link 122 has been rotated such that a portion of the partially disconnected pitch link 122 is coupled to and immobilized by the support connector 146. Thus, the partially disconnected pitch link 122 is not free to rotate downward (toward the lower plate 404). Accordingly, the partially disconnected pitch link 122 is retained in a position that allows further maintenance to be performed without concern that the partially disconnected pitch link 122 may inadvertently contact another structure of the rotorcraft (such as the antenna 112 of FIG. 1 and FIG. 2A) and thereby be damaged or cause damage.

Figure 5A:
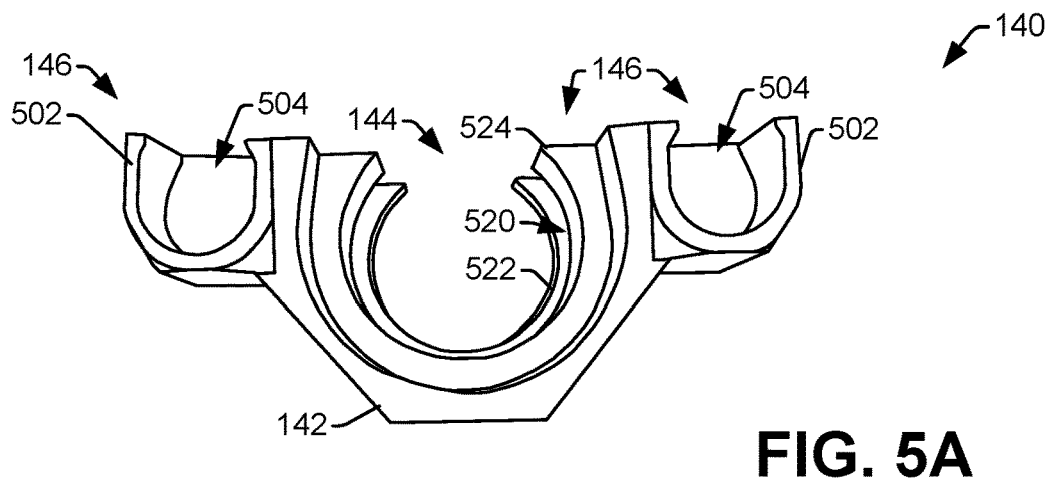
FIG. 5A is a diagram that illustrates another example of the rotorcraft service fixture of FIG. 1 according to a particular implementation.
Figure 5B:
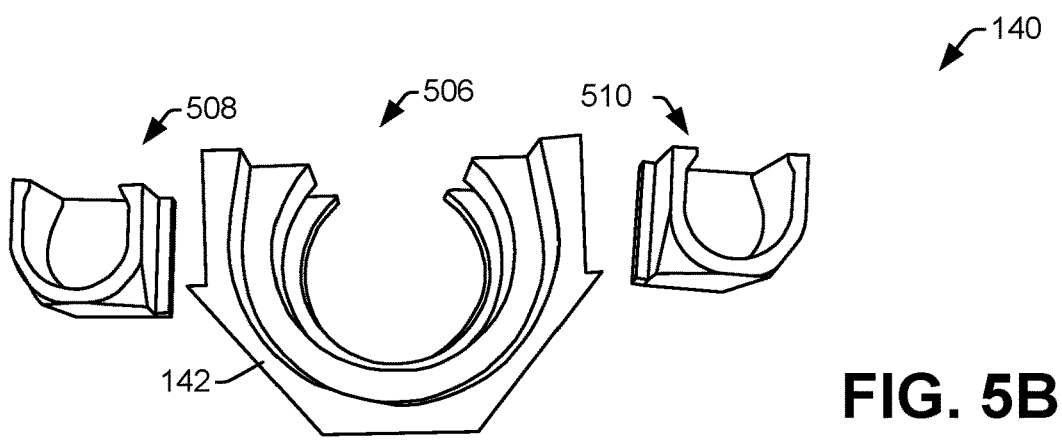
FIG. 5B is a diagram that illustrates components of the rotorcraft service fixture of FIG. 5A before the components are assembled according to a particular implementation.
Figure 5C:
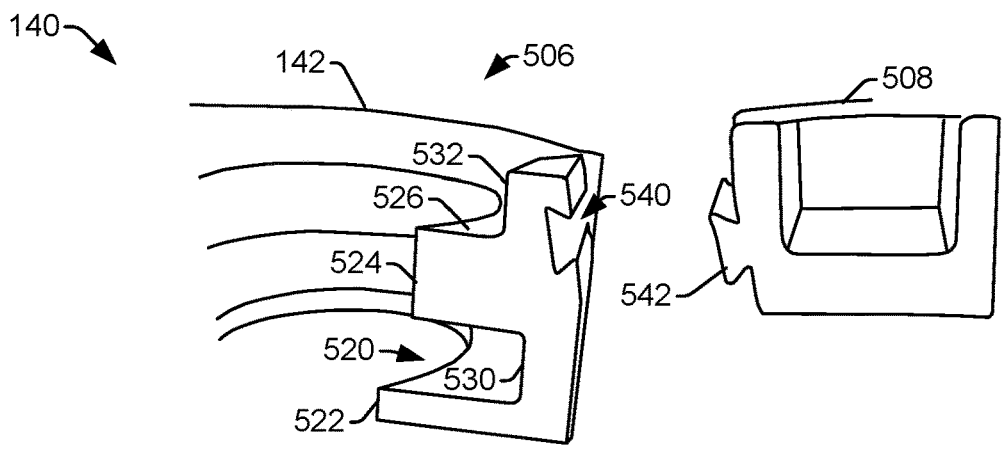
FIG. 5C is a diagram that illustrates details of a mechanism for coupling components of the rotorcraft service fixture of FIG. 5A according to a particular implementation.

FIG. 5A is a diagram that illustrates another example of the rotorcraft service fixture 140 of FIG. 1 according to a particular implementation. FIG. 5B is a diagram that illustrates components of the rotorcraft service fixture of FIG. 5A before the components are assembled according to a particular implementation, and FIG. 5C is a diagram that illustrates details of a mechanism for coupling components of the rotorcraft service fixture of FIG. 5B according to a particular implementation. FIGS. 5A and 5B show a top view of the rotorcraft service fixture 140, and FIG. 5C shows a front view of a portion of the rotorcraft service fixture 140. The rotorcraft service fixture 140 of FIG. 5B includes multiple components, including a first component 506, a second component 508 and a third component 510. In some implementations, the first component 506 can be used by itself as a rotorcraft service fixture 140 to couple to the pitch housing 132 and to retain (e.g., immobilize) a partially detached rotor strap pack 134. Alternatively, the first component 506 can be coupled to the second component 508, the third component 510, or both, to form a rotorcraft service fixture 140 to couple to the pitch housing 132 and to retain (e.g., immobilize) a partially detached rotor strap pack 134 and to couple to one or more partially detached dampers 130. In some implementations, the first component 506, the second component 508, and the third component 510 can be formed together as a single, unified rotorcraft service fixture 140 (e.g., by simultaneously 3D printing the first, second, and third components 506, 508, and 510 as a unified whole).

Figure 6A:
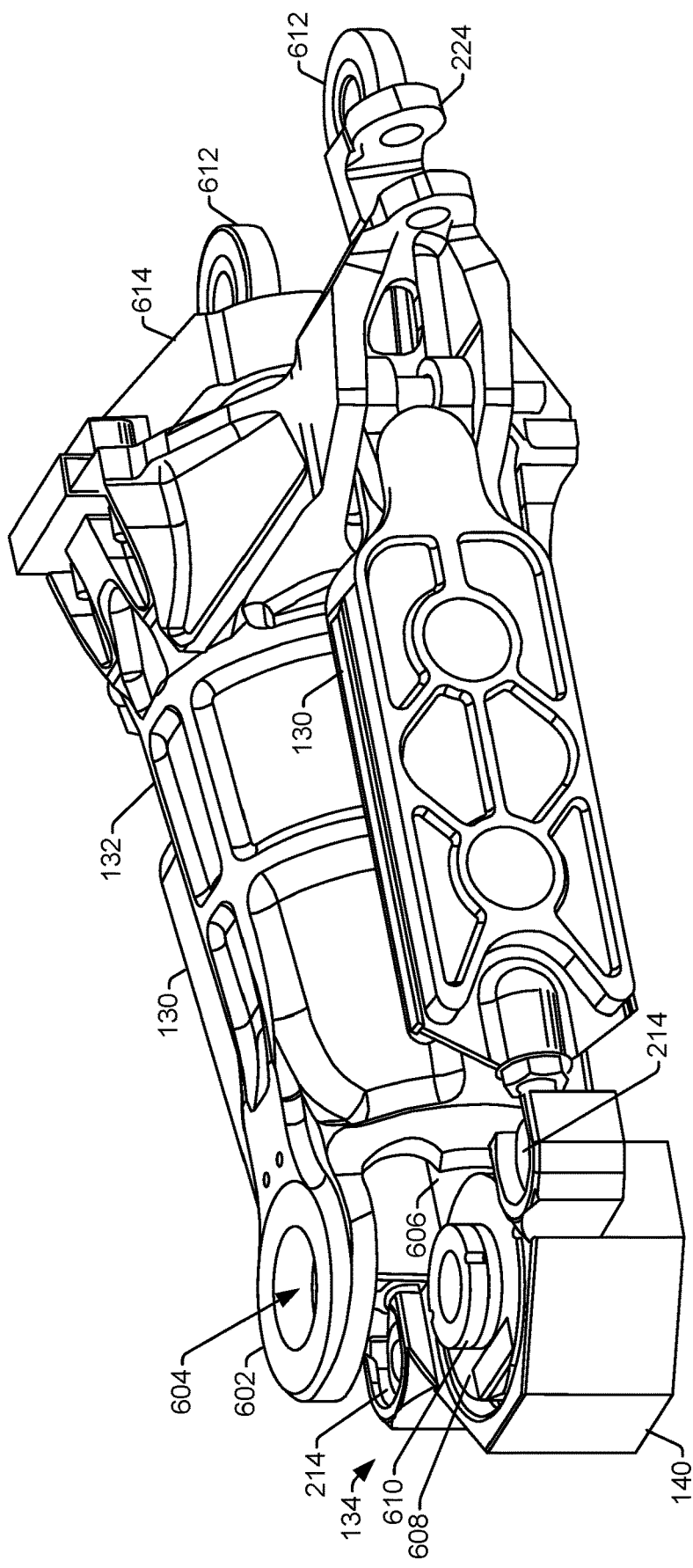
FIG. 6A is a diagram that illustrates a pitch housing and dampers of the rotor mast of FIG. 1 or FIG. 2 and the rotorcraft service fixture of FIG. 5.
Figure 6B:
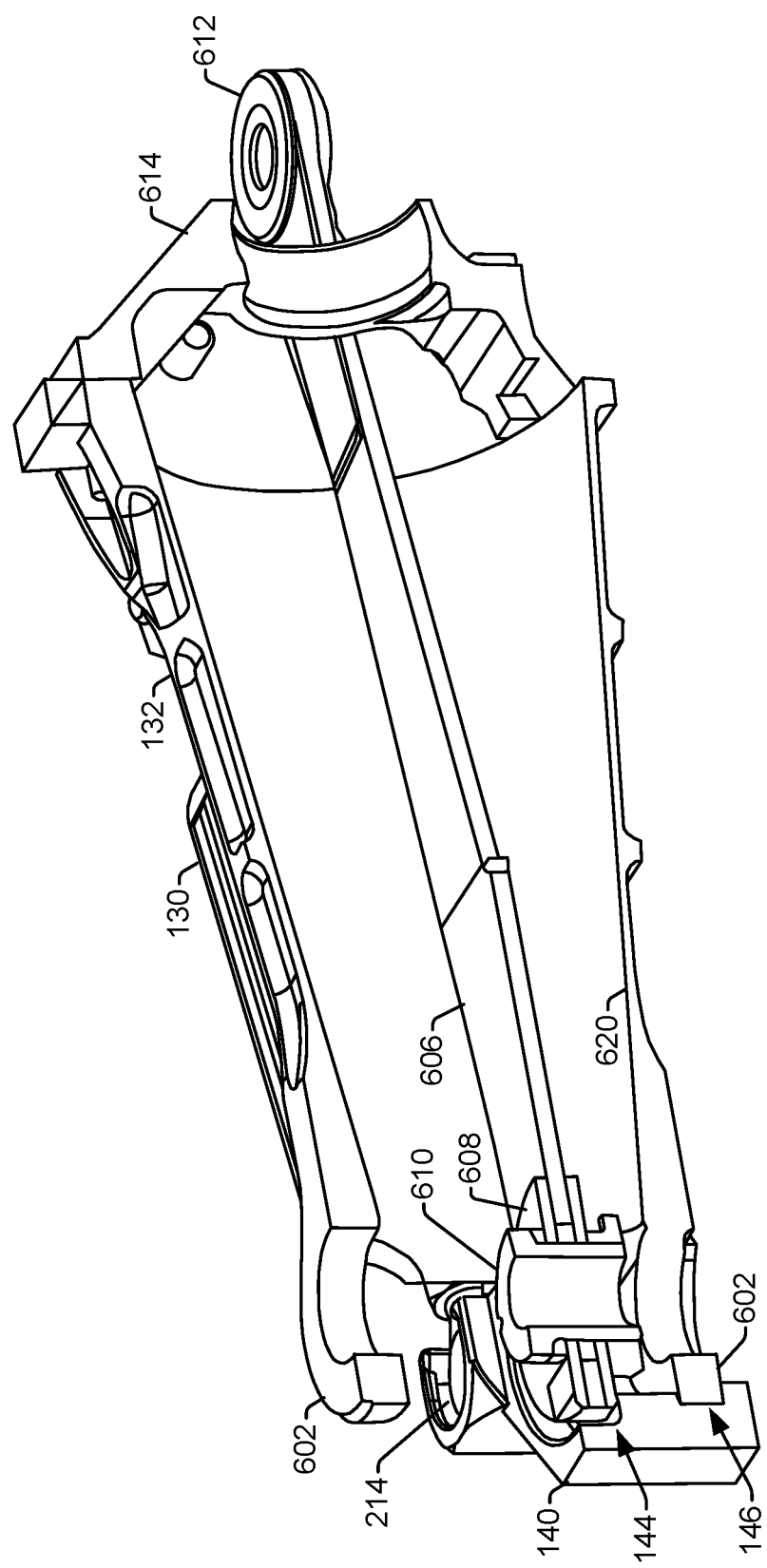
FIG. 6B is a diagram that illustrates a cross sectional view of the pitch housing and the rotorcraft service fixture of FIG. 6A.

As illustrated in FIGS. 5A and 5C, a central portion of the fixture body 142 of the rotorcraft service fixture 140 (e.g., a portion corresponding to the first component 506) includes sidewalls 530 and 532 defining a semi-circular opening. A first wall 522 extends from the sidewall 530 to form a first ledge, which corresponds to a first side of a channel 520. A second wall 524 extends from the sidewalls 530 and 532 to define a second side of the channel 520 and to define a ledge 526. The channel 520 corresponds to the rotor assembly connector 144 of the rotorcraft service fixture 140 of FIGS. 5A-5C. The channel 520 is configured (e.g., sized and shaped) to couple to an end of a pitch housing 132 after a rotor blade 118 and lead/lag link 210 have been removed. In one implementation, the ledge 526 corresponds to the support connector 146 (or one of the support connectors 146) of the rotorcraft service fixture 140 of FIGS. 5A-5C. The ledge 526 is configured (e.g., sized and shaped) to couple to an end of rotor strap pack 134 within the pitch housing 132. FIGS. 6A and 6B illustrated the rotorcraft service fixture 140 of FIGS. 5A-5C coupled to a pitch housing 132 and rotor strap pack 134.

In some implementations, the rotorcraft service fixture 140 of FIGS. 5A-5C includes more than one support connector 146. For example, in FIG. 5A, the rotorcraft service fixture 140 includes three support connectors 146, including a central support connector 146 corresponding to the ledge 526 to support the rotor strap pack 134, and an additional support connector 146 on each side of the central support connector 146. The additional support connectors 146 each include a wall 502 defining an opening 504. The opening 504 is configured (e.g., sized and shaped) to couple to an end 214 of a damper 130.

FIG. 5C illustrates a mechanism for joining the first component 506 to the second component 508 by coupling a mating surface of the first component 506 to a mating surface of the second component 508. A similar mechanism can be used to join the first component 506 to the third component 510. In FIG. 5C, the first component 506 includes a channel 540 and the second component 508 includes a ridge 542 configured (e.g., sized and shaped) to couple to the channel 540. In other implementations, the first component 506 can include the ridge 542 and the second component 508 can include the channel 540, or another mechanism can be used to join the first and second components 506, 508.

FIG. 6A is a diagram that illustrates a side view a pitch housing 132 and dampers 130 coupled to the rotorcraft service fixture 140 of FIG. 5A. FIG. 6B is a diagram that illustrates a cross sectional view of the pitch housing 132 and the rotorcraft service fixture 140 of FIG. 6A. In FIGS. 6A and 6B, the pitch housing 132 is shown disconnected from the rotor hub 120 and a respective rotor blade 118 and lead/lag link 210.

In the implementation illustrated in FIGS. 6A and 6B, a first end 602 of the pitch housing 132 includes an opening 604 to receive the hinge pin 212 of FIG. 2B. When installed, the hinge pin 212 also extends through a collar 610 of the rotor strap pack 134. The collar 610 of the rotor strap pack 134 is coupled to a shoe 608, which is coupled to a strap 606. The strap 606 extends through an interior of the pitch housing 132 and divides into two portions, each of which terminates in a strap/hub connector 612. When fully assembled, the pitch housing 132 is rotatably coupled to the rotor hub 120 (shown in FIGS. 2A and 2B) via bearings (not shown) in a bearing housing at a second end 614 pitch housing 132.

The rotorcraft service fixture 140 is configured (e.g., sized and shaped) to enable coupling the rotor assembly connector 144 (of FIG. 5A) to the first end 602 and connecting a support connector 146 to the shoe 608 and/or the collar 610 of the strap pack 134. Additionally, when the rotorcraft service fixture 140 includes the second and third components 508, 510, the support connectors 146 of the second and third components 508, 510 can be coupled to the ends 214 of the dampers 130. The rotor assembly connector 144 provides an interference fit with respect to the first end 602 of the pitch housing 132. In some implementations, the support connector 146 provides an interference fit with respect to a portion of the rotor strap pack 134, such as the collar 610 or the shoe 608. When the second and third components 508, 510 are present, the support connector 146 of the second and third components 508, 510 can provide an interference fit with respect to the ends 214 of the dampers 130.

As shown in FIG. 6B, when the rotorcraft service fixture 140 is installed and supporting a portion of the rotor strap pack 134. In FIG. 6B, the rotorcraft service fixture 140 holds the strap 606, the shoe 608, and the collar 610 away from an interior surface 620 of the pitch housing 132 to prevent damage to the rotor strap pack 134 and/or the pitch housing 132 as a result of incidental contact therebetween.

Figure 7:
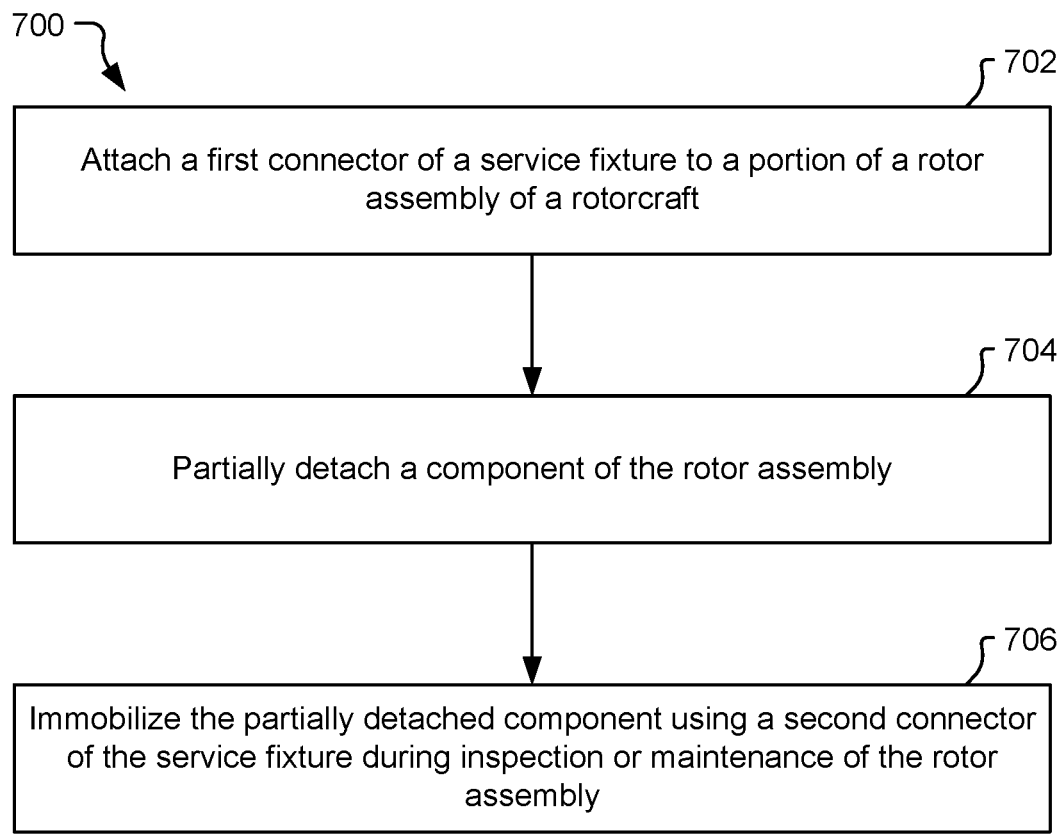
FIG. 7 is a flow chart of an example of a method of servicing a rotorcraft.

FIG. 7 is a flow chart of an example of a method 700 of servicing a rotorcraft, such as the rotorcraft 102 of FIG. 1 or 2A. The method 700 includes, at 702, attaching a first connector of a service fixture to a portion of a rotor assembly of a rotorcraft, and at 704, partially detaching a component of the rotor assembly.

For example, the rotorcraft service fixture 140 of FIG. 3 can be attached to the swashplate 124 by positioning the first protrusion 302 within the opening 230 of the upper plate 402 (of FIG. 4A) and positioning the second protrusion 304 along a side wall of the swashplate 124 such that the channel 306 (or more precisely, sidewalls of the protrusions 302, 304 that define the channel 306) form an interference fit with a portion of the swashplate 124. In this example, a pitch link 122 to be retained by the rotorcraft service fixture 140 of FIG. 3 can be partially detached from its corresponding pitch housing 132 before or after the rotorcraft service fixture 140 is attached to the swashplate 124. To illustrate, the rotorcraft service fixture 140 can be coupled to the swashplate 124 while the pitch link 122 is attached to both the swashplate 124 and the pitch housing 132. Subsequently, the pitch link 122 can be detached from the pitch housing 132 and rotated such that a portion of the pitch link 122 engages with and is immobilized by a portion of the rotorcraft service fixture 140. Alternatively, the pitch link 122 can be detached from the pitch housing 132 then the rotorcraft service fixture 140 can be coupled to the swashplate 124. The rotorcraft service fixture 140 can be coupled to the pitch link 122 before or after the rotorcraft service fixture 140 is coupled to the swashplate 124.

As another example, the rotorcraft service fixture 140 of FIGS. 5A-5C can be attached to the first end 602 of the pitch housing 132 by position the first end 602 within a channel 520 between the first wall 522 and the second wall 524 via an interference fit between the first end 602 and the first and second walls 522, 524. In this example, the pitch housing 132 can be partially detached before the rotorcraft service fixture 140 of FIGS. 5A-5C is attached to the pitch housing 132. To illustrate, the rotor blade 118 and lead/lag link 210 coupled to the pitch housing 132 can be detached from the pitch housing 132 to expose the first end 602 of the pitch housing 132 before the rotorcraft service fixture 140 of FIGS. 5A-5C is attached to the pitch housing 132.

The method 700 further includes, at 706, immobilizing the partially detached component using a second connector of the service fixture during inspection or maintenance of the rotor assembly. For example, the pitch link 122 can be immobilized by coupling a portion of the pitch link 122 to the support connector 146 of the rotorcraft service fixture 140 of FIG. 3. As described with reference to FIG. 3, the support connector 146 of the rotorcraft service fixture 140 of FIG. 3 corresponds to the first member 308 and the second member 310, which are arranged in a hook shape to define the channel 312, and the channel 312 is sized and shaped to retain the portion of the pitch link 122 via an interference fit.

As another example, a portion of the rotor strap pack 134, one or more dampers 130, or a combination thereof, can be immobilized by the rotorcraft service fixture 140 of FIGS. 5A-5C. In this example, the support connector 146 the rotorcraft service fixture 140 of FIGS. 5A-5C corresponds to the ledge 526, which is configured to couple to and support the shoe 608 and/or the collar 610 of the rotor strap pack 134. Alternatively, or in addition, the support connector 146 the rotorcraft service fixture 140 of FIGS. 5A-5C corresponds to the opening 504, which is configured to retain the end 214 of the damper 130.

In conjunction with the described aspects, a rotorcraft service fixture 140 includes means for removably attaching to the rotor assembly 116 of the rotorcraft 102. In a particular aspect, the means for removably attaching is sized and shaped to couple to the rotor assembly 116 via an interference fit. The rotorcraft service fixture 140 can also include means for supporting a first component of the rotor assembly. The means for supporting can be rigidly coupled to the means for removably attaching and configured to immobilize the first component relative to a second component of the rotor assembly after the first component is partially detached from the rotor assembly during inspection or maintenance of the rotor assembly. The means for supporting can be configured to prevent contact between the first component and the second component.

For example, the means for removably attaching can include a plurality of protrusions (e.g., the protrusions 302, 304 of FIG. 3) from the fixture body 142, and the plurality of protrusions can spaced apart from one another (to define the channel 306) to provide an interference fit with the second component (e.g. the swashplate 124). In this example, the means for supporting can include or correspond to the hook defined by the first and second members 308 and 310 that is sized to provide an interference fit with the first component (e.g., the pitch link 122). In this example, the means for removably attaching can be shaped and sized to couple to the swashplate before or after the pitch link 122 is partially detached from the rotor assembly 116.

As another example, the means for removably attaching can include a plurality of protrusions (e.g., the first and second walls 522 and 524 of FIG. 5C) from the fixture body (e.g., the sidewalls 530 and 532), and the plurality of protrusions can spaced apart from one another (to define the channel 520) to provide an interference fit with the second component (e.g., the end 602 of the pitch housing 132). In this example, the means for supporting can include or correspond to the ledge 526 defined by the second wall 524 that is configured to support the first component (e.g., a portion of the rotor strap pack 134). Alternatively, or in addition, in this example, the means for supporting can include or correspond to the opening 504 and the wall 502 of the second or third components 508, 510 of FIGS. 5A-5C, which are configured to support the first end 214 of the damper 130.

In a particular aspect, the means for removably attaching, the means for supporting, or both, include or are formed of an elastomeric polymer, such as a flexible thermoplastic polyurethane material. In some implementations, the rotorcraft service fixture 140 also includes a safety tag coupled to one or more of the means for removably attaching or the means for supporting.

In some implementations, the means for removably attaching and the means for supporting are integrated in a single fixture body, such as in the implementations illustrated in FIGS. 3 and 5A. In other implementations, the means for removably attaching and the means for supporting are separate components of the rotorcraft service fixture 140. In such implementations, a first mating surface of the means for removably attaching can be coupled to a second mating surface of the means for supporting. For example, the channel 540 of FIG. 5C can correspond to or include the first mating surface of the means for removably attaching and the ridge 542 can correspond to or include the second mating surface of the means for supporting.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A rotorcraft service fixture comprising:
   means for removably attaching to a rotor assembly of a rotorcraft; and
   means for supporting a first component of the rotor assembly, the means for supporting rigidly coupled to the means for removably attaching and configured to immobilize the first component relative to a second component of the rotor assembly after the first component is partially detached from the rotor assembly during inspection or maintenance of the rotor assembly; and
   wherein the first component includes a rotor strap pack and the second component includes a pitch housing, and wherein the means for removably attaching is shaped and sized to couple to the pitch housing and one or more dampers; or
   wherein the first component includes a pitch link and the second component includes a swashplate, and wherein the means for removably attaching is shaped and sized to couple to the swashplate before the pitch link is partially detached from the rotor assembly.

2. The rotorcraft service fixture of claim 1, wherein one or more of the means for removably attaching and the means for supporting comprises a flexible thermoplastic polyurethane material.

3. The rotorcraft service fixture of claim 1, wherein one or more of the means for removably attaching and the means for supporting comprises an elastomeric polymer.

4. The rotorcraft service fixture of claim 1, wherein the means for removably attaching is sized and shaped to couple to the rotor assembly via an interference fit.

5. The rotorcraft service fixture of claim 1, further comprising a safety tag coupled to one or more of the means for removably attaching and the means for supporting.

6. The rotorcraft service fixture of claim 1, wherein the means for supporting is configured to prevent contact between the first component and the second component.

7. The rotorcraft service fixture of claim 1, wherein the means for removably attaching and the means for supporting are integrated in a single fixture body.

8. The rotorcraft service fixture of claim 1, wherein a first mating surface of the means for removably attaching is coupled to a second mating surface of the means for supporting.

9. The rotorcraft service fixture of claim 1, wherein the means for removably attaching defines a semi-circular opening and the means for supporting includes a ledge coupled to a wall of the semi-circular opening.

10. The rotorcraft service fixture of claim 1, wherein the means for removably attaching includes a plurality of protrusions from a fixture body, the plurality of protrusions spaced apart from one another to provide an interference fit with the second component.

11. The rotorcraft service fixture of claim 1, wherein the means for supporting includes a hook that is sized to provide an interference fit with the first component.

12. A rotorcraft service fixture comprising:
   a fixture body;
   one or more rotor assembly connectors rigidly attached to or integral with the fixture body, the one or more rotor assembly connectors sized and shaped to provide an interference fit with a portion of a rotor assembly of a rotorcraft to removably attach the fixture body to the portion of the rotor assembly;
   one or more support connectors rigidly attached to or integral with the fixture body, the one or more support connectors sized and shaped to provide an interference fit with a partially detached component of the rotor assembly to immobilize the partially detached component during inspection or maintenance of the rotor assembly; and
   wherein the one or more rotor assembly connectors and the one or more support connectors comprise a flexible thermoplastic polyurethane material or an elastomeric polymer.

13. The rotorcraft service fixture of claim 12, further comprising a safety tag.

14. The rotorcraft service fixture of claim 12, wherein the partially detached component includes a rotor strap pack and the portion of the rotor assembly includes a pitch housing.

15. The rotorcraft service fixture of claim 14, wherein the partially detached component includes a pitch link and the portion of the rotor assembly includes a swashplate.

16. A method for servicing a rotorcraft, the method comprising:
   providing a rotorcraft service fixture, wherein the rotorcraft service fixture comprises:
      means for removably attaching to a rotor assembly of a rotorcraft; and
      means for supporting a first component of the rotor assembly, the means for supporting rigidly coupled to the means for removably attaching and configured to immobilize the first component relative to a second component of the rotor assembly after the first component is partially detached from the rotor assembly during inspection or maintenance of the rotor assembly; and
      wherein the first component includes a rotor strap pack and the second component includes a pitch housing, and wherein the means for removably attaching is shaped and sized to couple to the pitch housing and one or more dampers; or
      wherein the first component includes a pitch link and the second component includes a swashplate, and wherein the means for removably attaching is shaped and sized to couple to the swashplate before the pitch link is partially detached from the rotor assembly;
   attaching a first connector of the rotorcraft service fixture to a portion of a rotor assembly of a rotorcraft; partially detaching a component of the rotor assembly; and
   immobilizing the partially detached component using a second connector of the rotorcraft service fixture during inspection or maintenance of the rotor assembly.

17. A method for servicing a rotorcraft, the method comprising:
   providing a rotorcraft service fixture, wherein the rotorcraft service fixture comprises:
   a fixture body;
      one or more rotor assembly connectors rigidly attached to or integral with the fixture body, the one or more rotor assembly connectors sized and shaped to provide an interference fit with a portion of a rotor assembly of a rotorcraft to removably attach the fixture body to the portion of the rotor assembly;

one or more support connectors rigidly attached to or integral with the fixture body, the one or more support connectors sized and shaped to provide an interference fit with a partially detached component of the rotor assembly to immobilize the partially detached component during inspection or maintenance of the rotor assembly; and wherein the one or more rotor assembly connectors and the one or more support connectors comprise a flexible thermoplastic polyurethane material or an elastomeric polymer;

attaching a first connector of the rotorcraft service fixture to a portion of a rotor assembly of a rotorcraft;

partially detaching a component of the rotor assembly; and immobilizing the partially detached component using a second connector of the rotorcraft service fixture during inspection or maintenance of the rotor assembly.

* * * * *

UNITED STATES PATENT AND TRADEMARK OFFICE
CERTIFICATE OF CORRECTION

| | |
|---|---|
| PATENT NO. | : 11,427,352 B2 |
| APPLICATION NO. | : 16/271633 |
| DATED | : August 30, 2022 |
| INVENTOR(S) | : Curtis Raymond Estevo et al. |

It is certified that error appears in the above-identified patent and that said Letters Patent is hereby corrected as shown below:

In the Claims

Column 12, Claim 15, Line 1, after "claim" delete "14" insert --12--.

Signed and Sealed this
Twenty-fifth Day of October, 2022

Katherine Kelly Vidal
*Director of the United States Patent and Trademark Office*